US012478223B2

(12) United States Patent
Tramontina et al.

(10) Patent No.: US 12,478,223 B2
(45) Date of Patent: Nov. 25, 2025

(54) DISPENSING DEVICE WITH IMPROVED MOTOR ASSEMBLY

(71) Applicant: Kimberly-Clark Worldwide, Inc., Neenah, WI (US)

(72) Inventors: Paul F. Tramontina, Harleysville, PA (US); Charles Agnew Osborne, Jr., Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 165 days.

(21) Appl. No.: 18/560,273

(22) PCT Filed: Jun. 21, 2021

(86) PCT No.: PCT/US2021/038214
§ 371 (c)(1),
(2) Date: Nov. 10, 2023

(87) PCT Pub. No.: WO2022/271142
PCT Pub. Date: Dec. 29, 2022

(65) Prior Publication Data
US 2024/0225375 A1 Jul. 11, 2024

(51) Int. Cl.
*A47K 5/12* (2006.01)
*H02K 7/14* (2006.01)

(52) U.S. Cl.
CPC ............. *A47K 5/1217* (2013.01); *H02K 7/14* (2013.01); *A47K 5/1202* (2013.01)

(58) Field of Classification Search
CPC ...... A47K 5/1217; A47K 5/1202; H02K 7/14; H02K 7/06
See application file for complete search history.

(56) References Cited

U.S. PATENT DOCUMENTS 4,967,935 A 11/1990 Celest
6,131,773 A * 10/2000 Wade .................. A47K 5/1215 222/153.09

(Continued)

FOREIGN PATENT DOCUMENTS

CN 200945132 Y 9/2007
CN 201719151 U 1/2011

(Continued)

OTHER PUBLICATIONS

PCT Search Report Corresponding to Application No. PCT/US2021/038214 on Oct. 28, 2021.

(Continued)

*Primary Examiner* — Vishal Pancholi
(74) *Attorney, Agent, or Firm* — Dority & Manning, P.A.

(57) ABSTRACT

A dispenser for viscous liquid is provided. The dispenser includes a housing having an interior volume so as to retain at least one internal liquid reservoir; and a dispensing mechanism contained within the housing for dispensing the viscous liquid. The dispensing mechanism comprising a motor assembly including: a motor having a motor shaft coupled to a motor holder; a first elastomeric member disposed between the motor and the motor holder; a cam having a cam shaft disposed on the motor shaft, the cam shaft having a first end coupled to the cam and a second end coupled to the motor housing; and a rocker arm coupled to the motor housing. The rocker arm has a slot configured to receive the cam shaft and a first end coupled to the internal liquid reservoir such that actuation of the cam shaft moves the rocker arm to dispense the viscous liquid.

20 Claims, 15 Drawing Sheets

(56) References Cited

U.S. PATENT DOCUMENTS

| | | | | |
|---|---|---|---|---|
| 6,209,752 | B1 | 4/2001 | Mitchell et al. | |
| 7,066,355 | B2 * | 6/2006 | Lewis | B05B 7/0037 222/145.5 |
| 7,527,178 | B2 * | 5/2009 | Lewis | A47K 5/1217 222/105 |
| 7,621,426 | B2 * | 11/2009 | Reynolds | A47K 5/1217 222/23 |
| 7,980,421 | B2 * | 7/2011 | Ophardt | A47K 5/1217 250/221 |
| 7,984,825 | B2 * | 7/2011 | Ophardt | A47K 5/1217 250/221 |
| 8,002,150 | B2 * | 8/2011 | Ophardt | A47K 5/1207 222/321.6 |
| 8,261,950 | B2 * | 9/2012 | Cittadino | A47K 5/1202 222/325 |
| 8,413,852 | B2 * | 4/2013 | Ophardt | G01F 11/025 222/321.6 |
| 8,622,243 | B2 * | 1/2014 | Ophardt | G01F 11/006 250/221 |
| 8,668,116 | B2 * | 3/2014 | Ciavarella | B05B 11/1087 239/602 |
| 9,365,343 | B2 | 6/2016 | Klemm et al. | |
| 9,700,181 | B1 * | 7/2017 | Santoro | A47K 5/14 |
| 10,893,780 | B2 * | 1/2021 | Ophardt | G01F 11/023 |
| 2015/0053720 | A1 * | 2/2015 | Wolf | A47K 5/12 222/325 |

FOREIGN PATENT DOCUMENTS

| | | | |
|---|---|---|---|
| CN | 201861520 | U | 6/2011 |
| CN | 203776790 | U | 8/2014 |
| CN | 205107499 | U | 3/2016 |
| CN | 209474483 | U | 10/2019 |
| TW | M304322 | U | 1/2007 |
| WO | WO2006092748 | A2 | 9/2006 |

OTHER PUBLICATIONS

ETONM, DC Gear Motor, ETONM Motor: DC&Gear Motor Solutions, 14 Pages.

* cited by examiner

DISPENSING DEVICE WITH IMPROVED MOTOR ASSEMBLY

RELATED APPLICATIONS

The present application is the national stage entry of International Patent Application No. PCT/US2021/038214 having a filing date of Jun. 21, 2023, which is incorporated herein in its entirety by reference thereto.

BACKGROUND

Washrooms in commercial and residential buildings typically include products such as toilet tissue, paper towels, diapers, feminine products, liquid products such as soap, and aerosol products such as air fresheners. These products are typically housed by a dispenser and are dispensed as needed by the user. Certain dispenser used in public restrooms and the like are wall mounted units that typically include a house or structure that is affixed to a wall. These can be opened by a maintenance person for refilling or servicing. The dispensers typically include a delivery device, such as a dosing pump, and a sensor that activates device, such as a lever or button, for actuating the dosing pump in order to dispense a liquid product (e.g., hand soap). This type of dispenser has become known in the art as a "hands-free" dispenser in that it is not necessary for the user to manually activate or otherwise handle the dispenser to initiate a dispense cycle. The control systems and mechanical aspects of hands-free dispensers are wide and varied. Certain of these automatic dispensers include motors and motor housing that are operable to dispense product from the dispenser. Conventional dispensers include motors and motor housing that are subject to friction and vibration during operation of the motor to dispense product. Such friction and vibration can cause wear and breakage. When such wear occurs, this can cause the motor to not work properly or can cause the dispenser to generate offensive noise during operation of the dispenser.

In view of the above, a need exists for a dispenser design that allows for more improved dispenser design control and/or for incorporating different functionality into a dispenser.

SUMMARY

In general, the present disclosure is directed to a dispenser for viscous liquid, such as hand soap, that includes an improved motor assembly that can reduce friction and/or vibrational-generated noise during operation of the motor assembly. In one embodiment, the dispenser can include a housing having an interior volume so as to retain at least one internal liquid reservoir and a dispensing mechanism contained within the housing for dispensing the viscous liquid. The dispensing mechanism includes a motor assembly. The motor assembly includes a motor having a motor shaft coupled to a motor holder. A first elastomeric member is disposed between the motor and the motor holder. The first elastomeric member can, advantageously, reduce vibration transfer between the motor and the motor holder during operation of the motor. The motor assembly further includes a cam having a cam shaft disposed on the motor shaft. The cam shaft includes a first end coupled to the cam and a second end coupled to the motor housing. For instance, coupling a second end of the cam shaft to the motor housing can reduce wear on the cam shaft given eccentric motion during operation of the cam via the motor. The motor assembly includes a rocker arm coupled to the motor housing and operably coupled to the cam shaft. For instance, the rocker arm can include a slot configured to receive and retain the cam shaft during operation of the motor. The rocker arm is coupled to the cam shaft and is configured to move upon the motor rotating the cam. At least one end and/or portion of the rocker arm is coupled to the internal liquid reservoir such that actuation of the cam and, subsequently the cam shaft, moves the end of the rocker arm to dispense the viscous liquid from the dispenser. For example, at least one end of the rocker arm can be operably connected to a nozzle with a portion disposed in the internal liquid reservoir. Wherein translation of the rocker arm via the motor and cam assembly, activate the nozzle causing viscous liquid product to be dispensed from the internal liquid reservoir.

In accordance with the present disclosure, the second end of the cam shaft can be disposed in and/or on a bearing and or a bushing and can be secured to the motor holder via a bearing housing. In such embodiments, the bearing or bushing can include one or more elastomeric members and/or gaskets for reducing friction between the second end of the cam shaft and the motor holder. The second end of the cam can also be outfitted with a member having an L-shaped geometry. The lower section of the L-shaped geometry, which can be secured to the motor holder, can be on the same centerline as the motor shaft. Securing the second end of the cam shaft via securing the lower section of the L-shaped geometry about the same center line as the motor shaft, provide additional support and can reduce or eliminate eccentric load on the cam, cam shaft, and rocker arm, during rotation of assembly.

In certain embodiments, the rocker arm can be configured to include an open portion about the slot to allow for ease of assembly of the motor assembly. For instance, the rocker arm can include an open portion which allows the cam shaft to be more easily placed within the slot. Upon proper placement of the cam shaft within the slot, a rocker arm connector can then be placed in the open portion, effectively closing the open portion, and closing the slot. In other embodiments, however, the rocker arm can be configured with the slot integrally formed in the rocker arm. In such embodiments, the slot is completely formed and there is no open portion or need for a rocker arm connector.

In certain embodiments, the dispenser further includes a component housing secured in the interior volume of the dispenser. The component housing can house one or more components (e.g., the dispensing mechanism) of the dispenser. In embodiments the motor assembly is disposed in the component housing via one or more connection points. One or more elastomeric members can be disposed on the one or more connection points between the component housing and the motor assembly. Disposition of elastomeric members on and/or between the connection of the motor assembly and the component housing can further reduce vibrations from being transferred from the motor assembly to the component housing during operation of the motor assembly. Accordingly, audible vibrational frequencies can be reduced or prevented from being transferred from the motor assembly to the component housing and or dispenser housing, resulting in a quieter, operating dispenser. Furthermore, the component module can include other operation components of the dispenser, such as battery packs, printed circuit boards, and/or one or more sensors.

In certain embodiments, the dispenser can include a switch electrically coupled to the printed circuit board. The switch can be configured to detect and/or communicate when a new internal liquid reservoir is placed in the dispenser. Accordingly, portions of the switch can be disposed on the component module. Certain portions of the switch can be disposed on the component module in a location where at least a portion of the internal liquid reservoir is configured to be placed. Accordingly, placement of a portion of the internal liquid reservoir within the component module can effectively activate the switch. In certain embodiments, activation of the switch can be configured to reset a dispense count to zero.

In other embodiments, the dispenser can include one or more sensors configured to monitor one or more operations of the dispenser, and one or more controllers configured to obtain dispenser data from the one or more sensors and/or, optionally, configured to transmit data to a cloud-based management service.

In certain embodiments, the viscous liquid dispensed from the disclosed dispenser is hand soap and/or hand sanitizer.

In certain embodiment, the dispenser housing includes a back cover and a front cover. The back cover is generally configured to be secured to a mounting surface (such as a wall) and a front cover. The front cover is moveable from a closed position to an open position. When in closed position, the front cover can be locked to the back cover, in order to prevent tampering of the internal components of the dispenser. When in an open position, used internal liquid reservoirs can be removed and new, full, internal liquid reservoirs can be placed in the dispenser. Also, batteries can be replaced as needed, and the printed circuit board can be accessed for obtaining dispenser data, as necessary. The housing can also include an opening therethrough adjacent to a bottom surface of the housing for dispensing viscous liquid.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
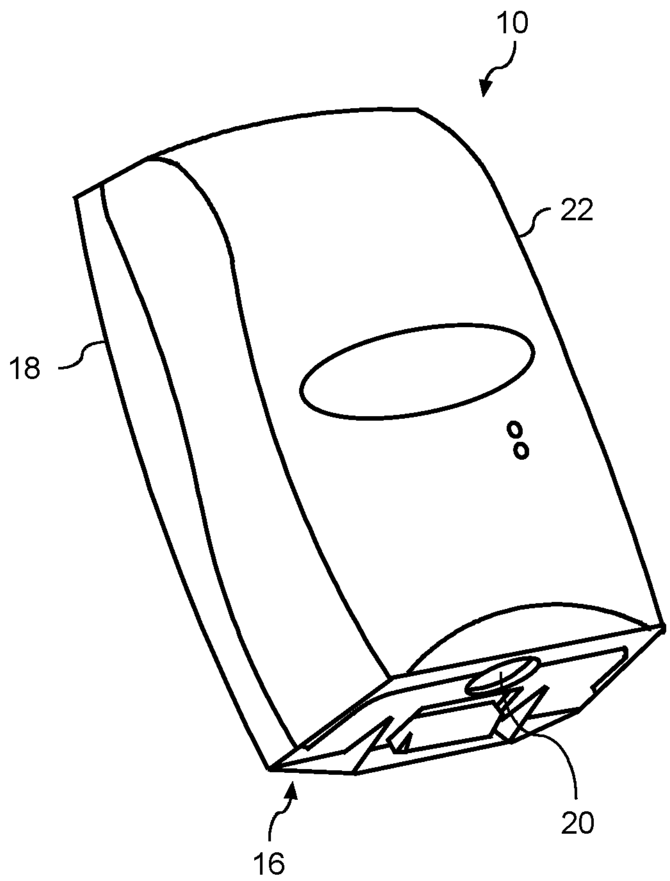
FIG. 1 is a perspective view of one embodiment of a dispenser in accordance with the present disclosure with its front cover in a closed position.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure. Embodiments of the present disclosure are directed to a dispenser for viscous liquids, such as hand soap, that include includes an improved motor assembly that can reduce noise and breakage of the motor assembly. For instance, the motor assembly as provided is secured to a motor holder providing a more robust motor assembly by reducing or eliminating the eccentric load on the rocker arm and/or the cam. Further elastomeric members and or gaskets can be disposed at various locations of the motor assembly in order to reduce friction and transferred vibrations between the motor assembly and the dispenser. For example, an elastomeric member is disposed between the motor and the motor holder in order to reduce friction between the motor and the motor holder, which can result in quieter motor assembly. Further, elastomeric members can be disposed between the motor housing and a component module such that friction or vibrations due to operation of the motor are not transferred to the overall dispenser housing, which results in quieter operation of the dispenser.

Additionally, while one end of the cam shaft is affixed to the cam and motor, the other end can be secured to the motor housing. For example, the second end of the cam shaft can be disposed in a bearing or bushing and then secured to the motor housing, which can also result in less friction and noise during operation of the dispensing mechanism. Furthermore, securing the second end of the cam shaft to the motor housing can reduce eccentric load on the cam and the rocker arm.

Figure 2:
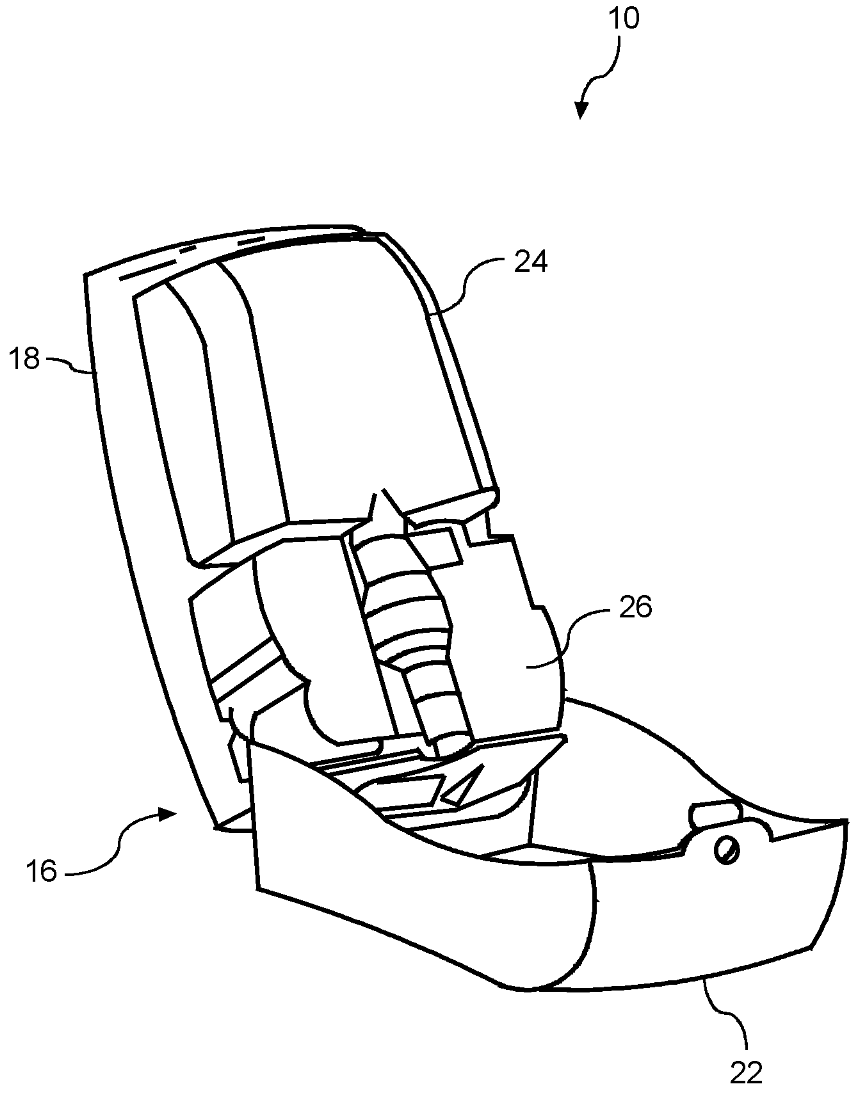
FIG. 2 is a perspective view of one embodiment of a dispenser in accordance with the present disclosure with its front cover in an open position.
Figure 3:
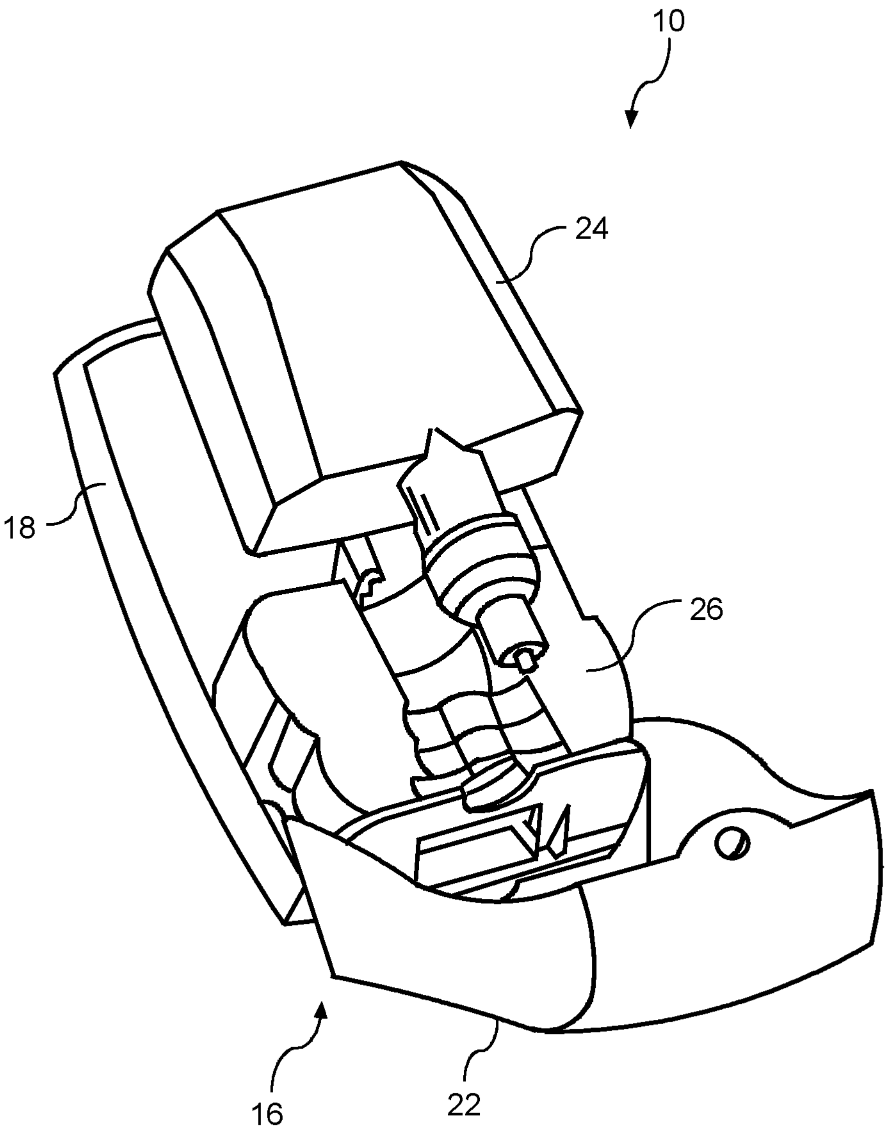
FIG. 3 is a perspective view of one embodiment of a dispenser in accordance with the present disclosure with its front cover in an open position.

Referring particularly to FIGS. 1-3, various embodiments of a dispenser 10 made according to the present disclosure are illustrated. As shown particularly in FIG. 1, the dispenser 10 includes a housing 16 that can have any desired overall shape. The housing 16 can include a two-part configuration. For example, the housing can include a back cover 18 and a front cover 22. The front cover 22 can be pivotally mounted to the back cover 18 using any suitable means. For example, in one embodiment, hinges can be used to connect the front cover 22 with the back cover 18. Alternatively, the front cover 22 can be completely separable from the back cover 18. The front cover 22 is moveable from a closed position as shown in FIG. 1 to an open position as shown in FIGS. 2-3. The dispenser 10 can also include any conventional locking mechanism for securing the front cover 22 to the back cover 18. As shown in FIGS. 2-3, the dispenser 10 can also include an internal liquid reservoir 24 and a component module 26 disposed therein. The housing 16 further includes an opening 20 through which a dispensable product (e.g., viscous liquid) is dispensed. The opening 20 can be disposed in a bottom surface of the housing 16.

The operational components of the dispenser 10 may be mounted directly to the back cover 18 or can be part of a module (e.g., the component module 26) that is received within the housing 16. For example, the operational components can be part of a module that may be readily removable from the housing for servicing and/or replacing components without the necessity of having to remove the entire dispenser 10 from its support surface.

Figure 4:
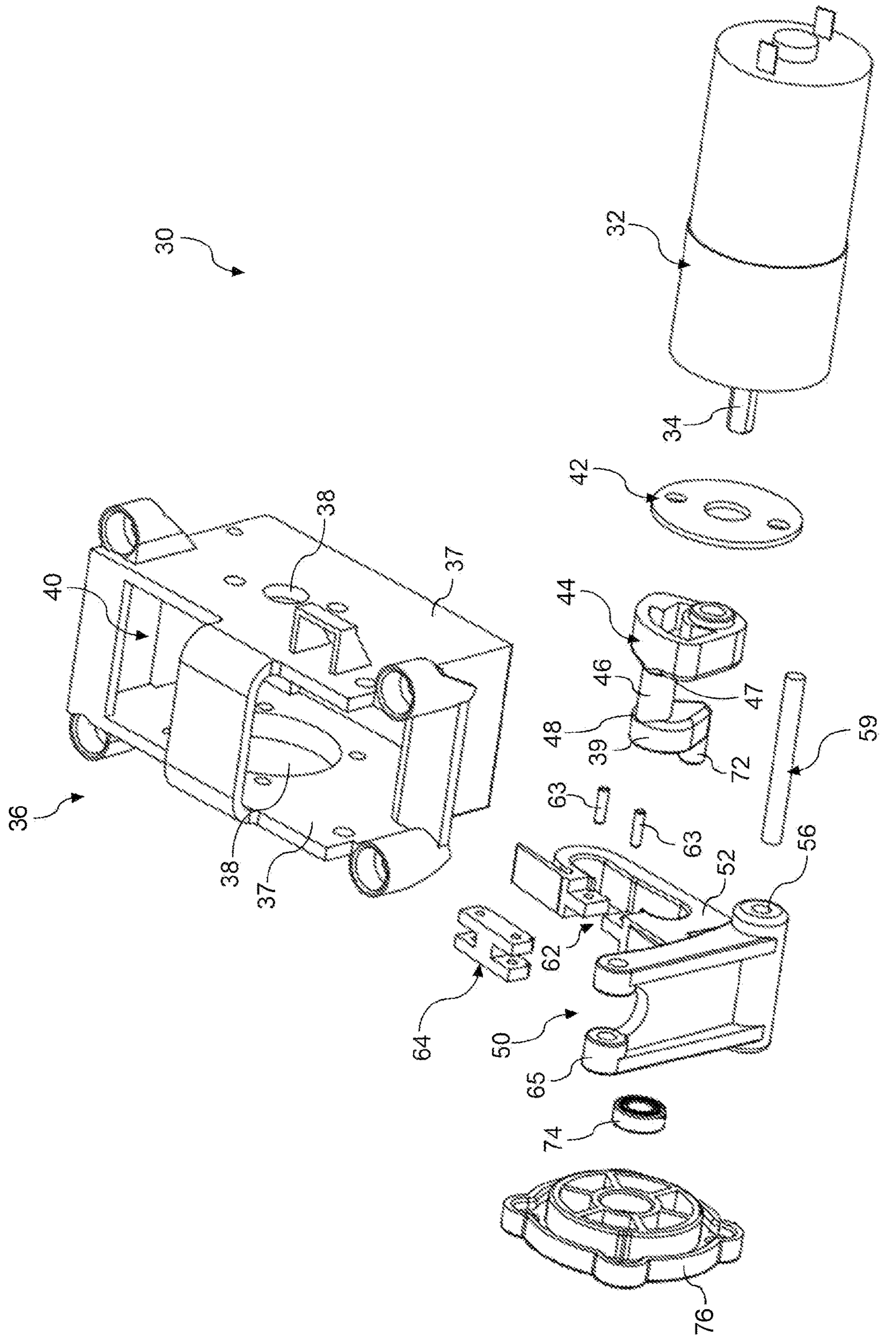
FIG. 4 is an exploded view of one embodiment of a motor assembly in accordance with the present disclosure.
Figure 12:
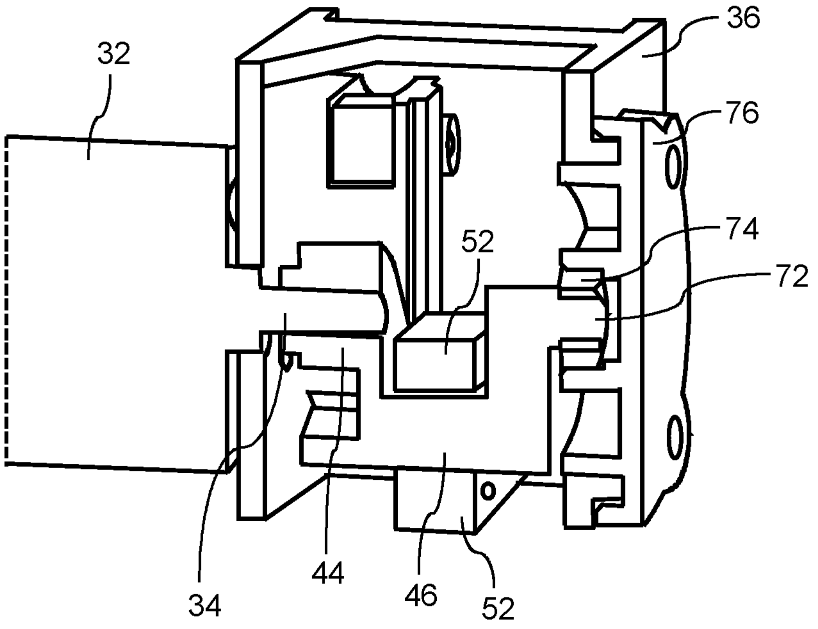
FIG. 12 is a cross-sectional view of one embodiment of a portion of a motor assembly in accordance with the present disclosure.
Figure 13:
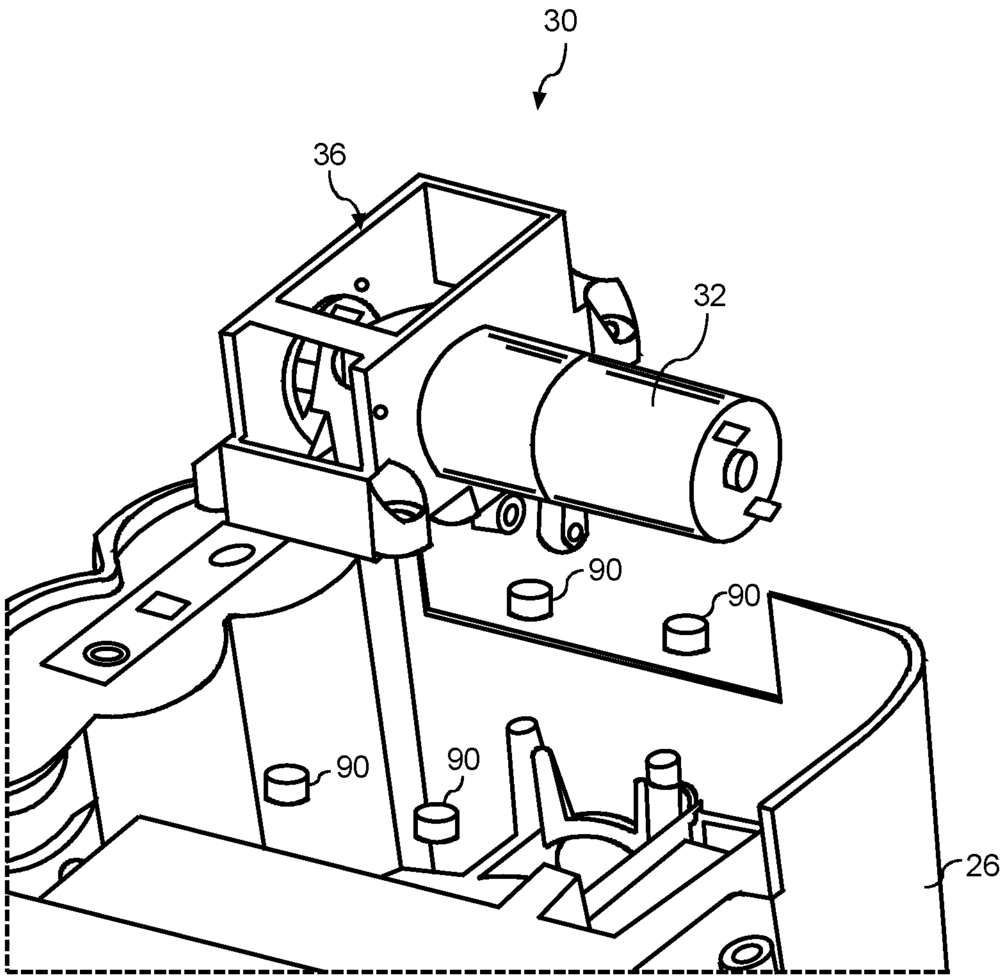
FIG. 13 is a perspective view of a portion of an embodiment of a component module and a motor assembly in accordance with the present disclosure.

The operational components included in the dispenser can include a dispensing mechanism including a motor assembly. Referring now to FIGS. 4-7 and 9-12, illustrated are embodiments of a motor assembly 30 according to example embodiments of the present disclosure. For example, FIG. 4 provides an exploded view of the components of the motor assembly 30, while FIGS. 5-7 and 9-11 illustrate one embodiment of an example assembly of the components of the motor assembly. Further, FIG. 12 illustrates a cross-sectional view of the motor assembly 30. Accordingly, given the order of component assembly some of the components of the motor assembly may not be shown in all of the referenced figures.

Figure 5:
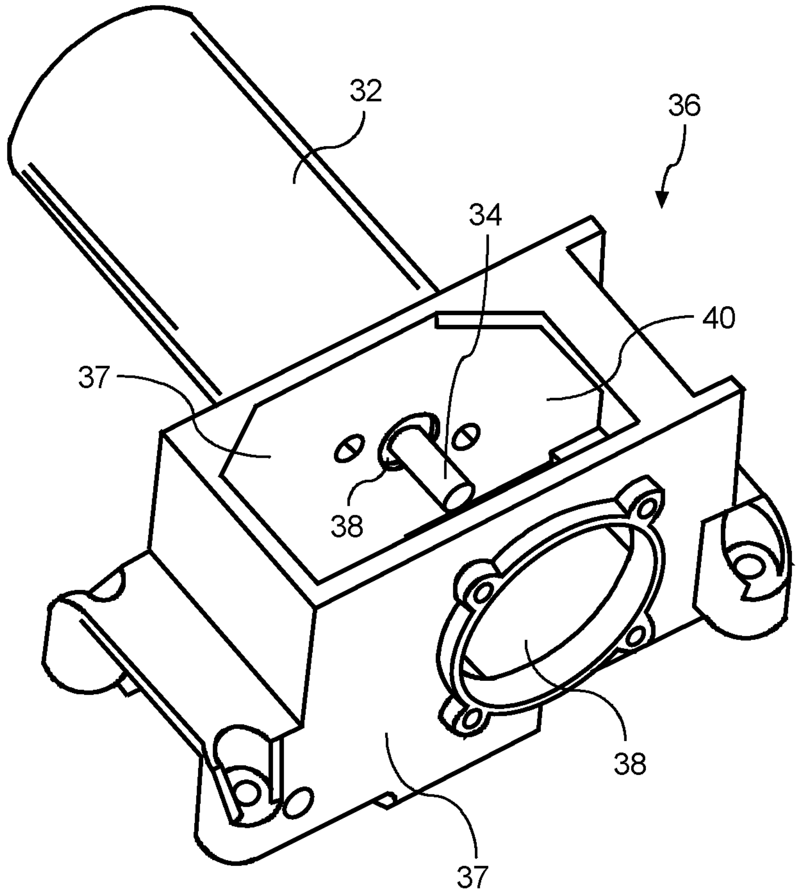
FIG. 5 is a partial perspective view of one embodiment of a portion of a motor assembly in accordance with the present disclosure.
Figure 6:
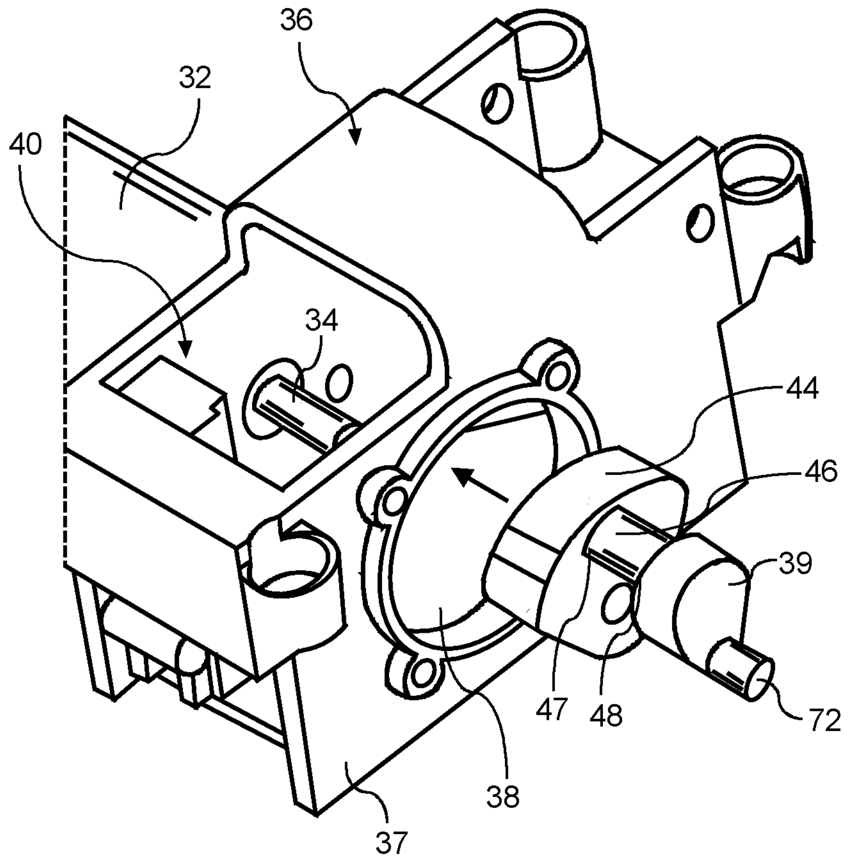
FIG. 6 is a partial perspective view of one embodiment of a portion of a motor assembly in accordance with the present disclosure.
Figure 7:
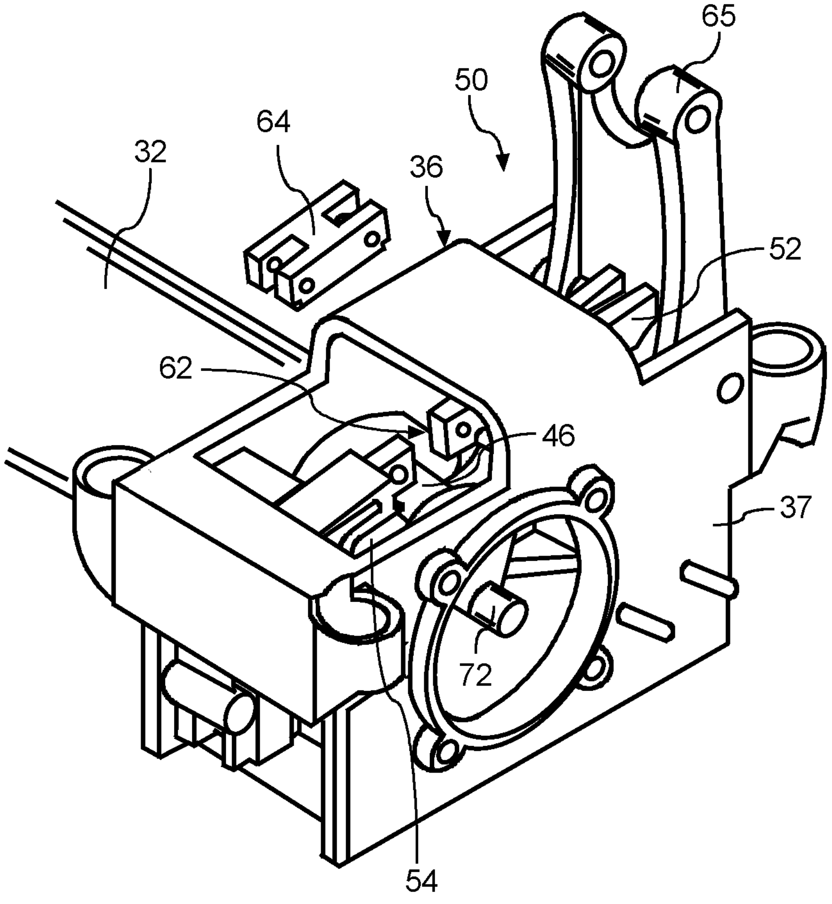
FIG. 7 is a partial perspective view of one embodiment of a portion of a motor assembly in accordance with the present disclosure.

The motor assembly 30 includes a motor 32 having a motor shaft 34 coupled thereon. The motor 32 can include any suitable motor, such as a brushless motor. The motor 32 is coupled to a motor holder 36. The motor holder 36 can include one or more sidewalls 37 having one or more apertures 38 disposed therein. For example, the apertures 38 can be positioned to allow for various components (e.g., the motor shaft 34) to pass through the sidewalls 37 and into an interior 40 of the motor holder 36. For example, as shown in FIG. 5, the motor shaft 34 is disposed through on of the sidewalls 37 of the motor holder 36 such that the motor shaft 34 is disposed in the interior 40 of the motor holder 36. An elastomeric member 42 (e.g., an elastomeric gasket) can be disposed between the motor 32 and one or more of the sidewalls 37 of the motor holder 36. Placement of the elastomeric member 42 in such a manner can reduce friction and vibrational transfer between the motor 32 and the motor holder 36.

A cam 44 can be disposed on the motor shaft 34. For example, the cam 44 can be fitted onto the motor shaft 34 via any suitable mechanism. For instance, in certain embodiments, the cam 44 can be press fitted or snap fitted onto the motor shaft 34. The cam 44 includes a cam shaft 46 having a first end 47 coupled to the cam 44 and a second end 48 coupled to the motor holder 36. As shown particularly in FIG. 6, in order to assembly the motor assembly 30, the cam 44, including cam shaft 46, can be placed through an aperture 38 disposed in the sidewall 37 of the motor holder 36. The cam 44 can be placed through the aperture 38 into the interior 40 of the motor holder 36 where the cam 44 can then be coupled to the motor shaft 34. The second end 48 of the cam shaft 46 can be outfitted with any suitable type of member in order to facilitate coupling of the cam shaft 46 to the motor holder 36. For example, in certain embodiments, the second end 48 of the cam 44 can include a member 39 having an L-shaped geometry. The member 39 can be further utilized to secure the cam shaft 46 to the motor holder as will be further discussed herein.

A rocker arm 50 is coupled to the motor holder 36. For example, the rocker arm 50 can include an arm portion 52 containing a slot 54 disposed therein and a coupling portion 56. The coupling portion 56 can be coupled to the motor housing 36. For example, in certain embodiments, the coupling portion 56 of the rocker arm 50 is disposed between two sidewalls 37 of the motor holder 36 such that the arm portion 52 extends into the interior 40 of the motor holder 36. The coupling portion 56 of the rocker arm 50 can be secured to the motor holder 36 via one or more pins 59. Furthermore, additional gaskets or elastomeric members can be disposed between connection points formed between the coupling portion 56 of the rocker arm 50 and the motor holder 36 in order to further reduce friction and/or wear between the component parts.

Figure 8C:
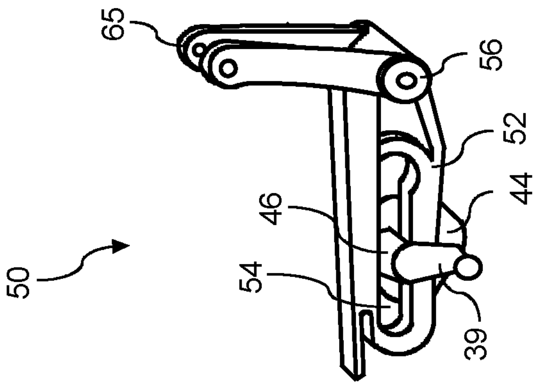
FIG. 8C is a partial perspective view of one embodiment of a portion of cam shaft and rocker arm in accordance with the present disclosure.
Figure 8B:
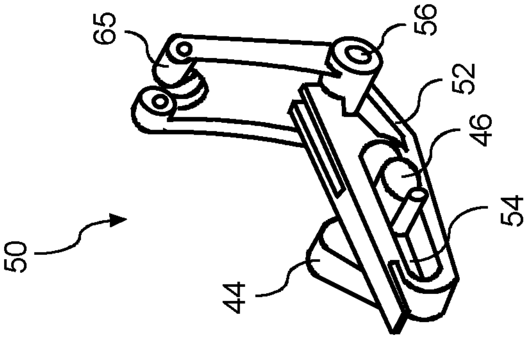
FIG. 8B is a partial perspective view of one embodiment of a portion of cam shaft and rocker arm in accordance with the present disclosure.
Figure 8A:
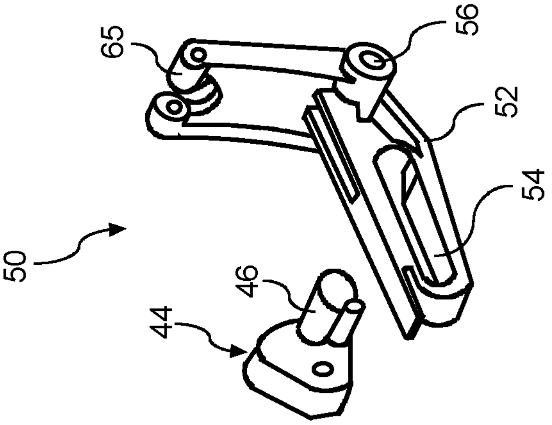
FIG. 8A is a partial perspective view of one embodiment of a portion of cam shaft and rocker arm in accordance with the present disclosure.
Figure 9:
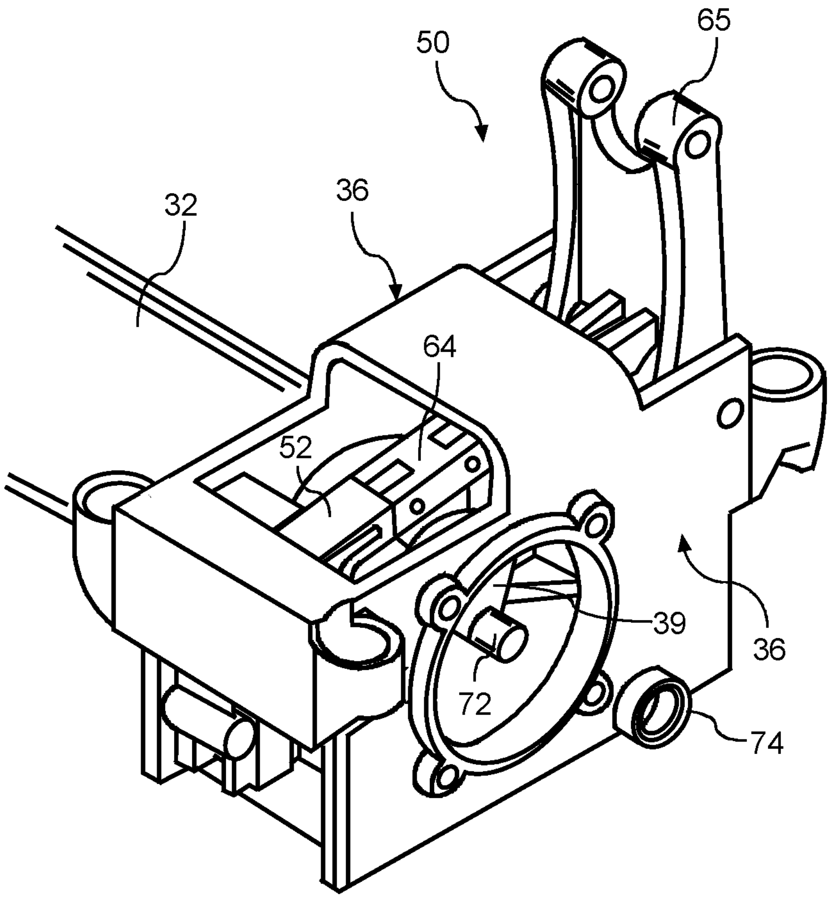
FIG. 9 is a partial perspective view of one embodiment of a portion of a motor assembly in accordance with the present disclosure.

Once the rocker arm 50 is disposed in the interior 40 of the motor holder 36, the cam shaft 46 can be disposed in the slot 54 arm portion 52 of the rocker arm 50. For example, in one embodiment, as shown particularly in FIGS. 4 and 7, the arm portion 52 includes a slot 54 having a cut-out portion 62. The cut-out portion 62 is shown as being disposed on a top portion of the slot 54, however, the disclosure is not so limited. Indeed, the cut-out portion 62 could be place on the bottom portion of the slot 54. The cut-out portion 62 is disposed such that the cam shaft 46 can be placed into the slot 54. Once the cam shaft 46 is placed within the slot 54, one or more rocker arm connectors 64 can be disposed in the cut-out portion 62 in order to close the cut-out portion 62 and to secure the cam shaft 46 within the slot 54. For example, the connector 64 can be placed in the cut-out portion 62 and one or more pins 63 can be used to secure the connector 64 in the cut out portion 62. In other embodiments, such as those shown in FIGS. 8A-8C, however, the arm portion 52 of the rocker arm 50 does not include a cut-out portion 62 and/or a connector 64. For example, the rocker arm 50 can include an integrally formed slot 54, such that no connector 64 is necessary. The cam shaft 46 can then be placed through the slot 54 in order to assembly the cam shaft 46 to the rocker arm 50.

Figure 10:
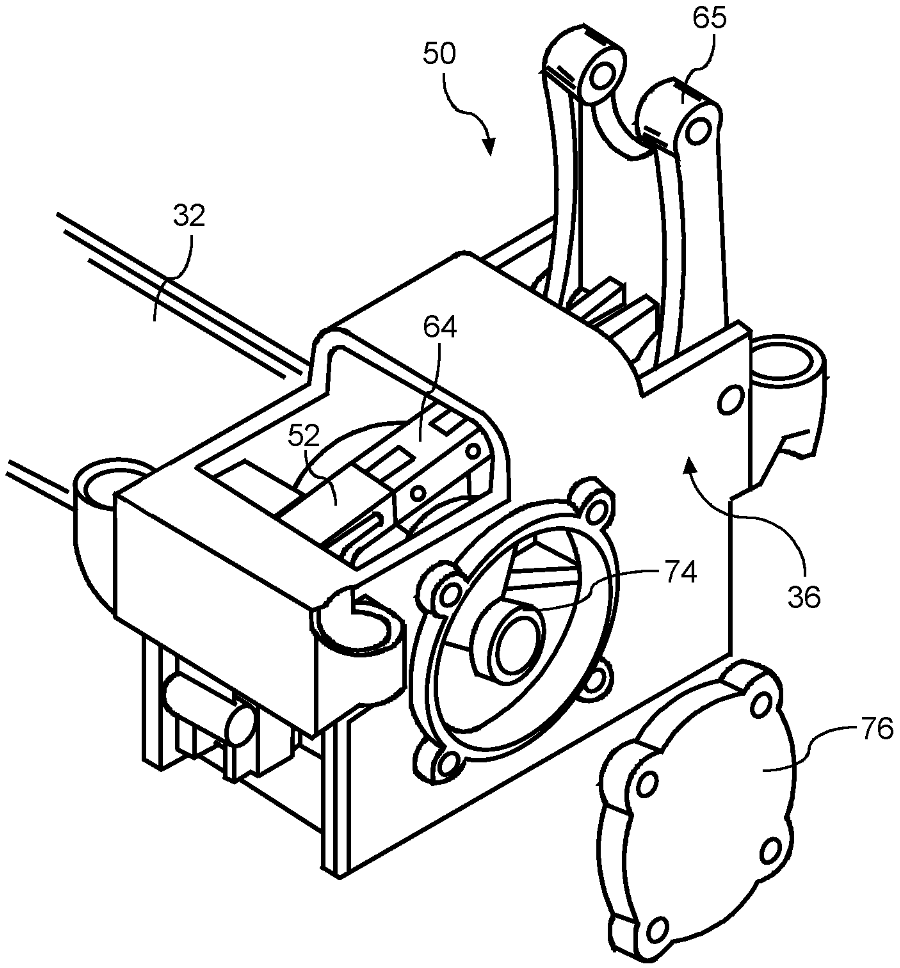
FIG. 10 is a partial perspective view of one embodiment of a portion of a motor assembly in accordance with the present disclosure.
Figure 11:
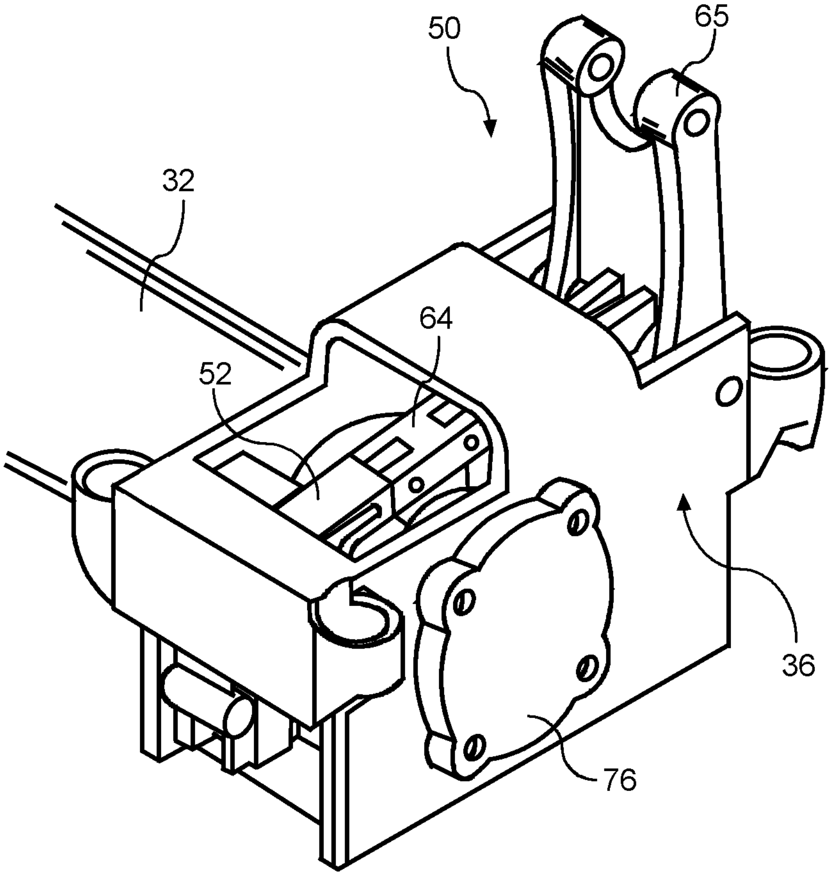
FIG. 11 is a partial perspective view of one embodiment of a portion of a motor assembly in accordance with the present disclosure.

Once the cam shaft 46 is proper assembly in the slot 54, the second end 48 of the cam shaft 46 can be configured to facilitate holding the cam shaft 46 in place in the slot 54. Furthermore, the second end 48 of the cam shaft 46 can be coupled to the motor holder 36. As shown, the second end 48 of the cam shaft 46 can include a member 39 having an L-shaped geometry, as shown particularly in FIGS. 4 and 9. In certain embodiments, the lower end 72 of the member 39 can be disposed generally about the same centerline as the motor shaft 34. Such disposition of the lower end 72 with respect to the motor shaft 34 can prevent additional eccentric friction and wear as the cam shaft 46 rotates within the slot 54. Furthermore, a bearing 74 or bushing can be disposed on the second end 48 of the cam shaft 46. For example, the bearing 74 can be disposed on the lower end 72 of the second end 48 of the cam shaft 46. The bearing 74 can help reduce friction and/or wear during rotation of the cam shaft 46 in the slot 54. A bearing housing 76 is then disposed with respect to the bearing 74 and the lower end 72 as shown in FIGS. 4 and 10. The bearing housing 76 secures the second end 48 of the cam shaft 46 to the motor housing 36. For example, in certain embodiments, the bearing housing 76 can be secured to one of the sidewalls 37 of the motor housing 36 with any suitable fastener. Suitable fasteners can include those that are able to create non-permanent joints, that is, the joint can be removed or dismantled without damaging the joined components. Suitable fasteners include, but are not limited to, anchors, bolts, nails, nuts, pins, clips rivets, rods, screws, clamps, washers, and combinations thereof. In certain embodiments, the fastener includes one or more screws.

Once the motor assembly 30 is assembled, it can be disposed within the component module 26 and placed within the interior of the housing 16 of the dispenser 10. For example, one or more connection points can be formed between the motor assembly 30 and the component module 26. Each connection point can be configured with additional elastomeric members 90 or gaskets for further reducing friction and vibrations generated by the motor assembly 30 from being transferred to the component module 26 and/or the dispenser 10. Disposition of the component module 26 and the motor assembly 30 in such a manner, ensure that less friction is transferred from the motor assembly 30 to the component module 26 and/or the dispenser 10 ensuring quieter operation of the dispenser 10.

Figure 14:
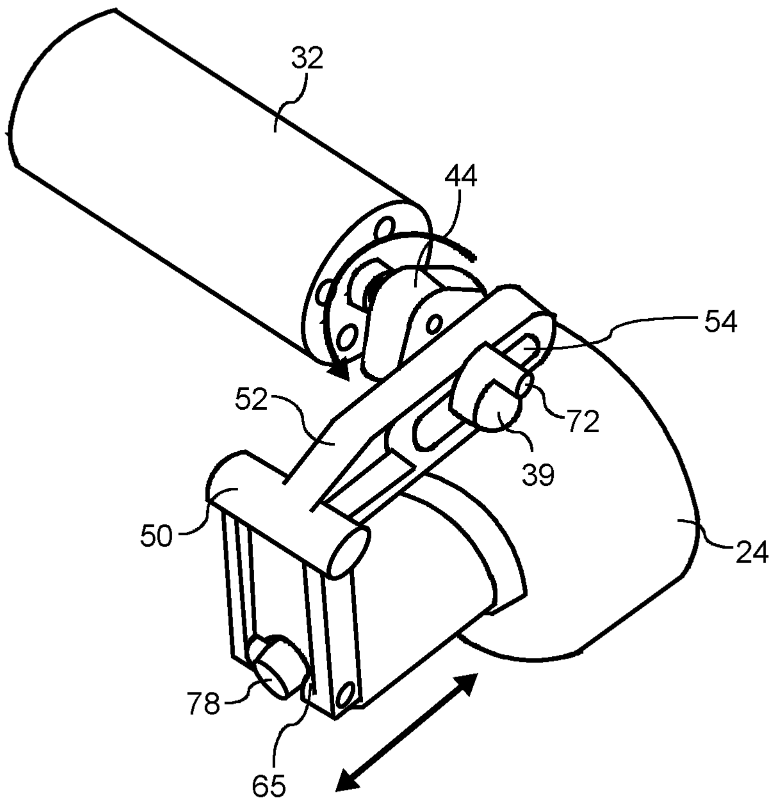
FIG. 14 is a perspective view of a portion of an embodiment of a motor assembly coupled to an internal liquid reservoir in accordance with the present disclosure.

The rocker arm 50 can then be coupled to an internal liquid reservoir 24, such that actuation of the cam shaft 46 moves the rocker arm 50 to dispense viscous liquid from the internal liquid reservoir 24. For example, the rocker arm 50 can include a first end 65 that is coupled to the internal liquid reservoir 24, as shown in FIG. 14. For example, the first end 65 can be coupled to a nozzle 78 disposed on or within the internal liquid reservoir 24. The nozzle 78 is configured such that actuation of the cam 44 and cam shaft 46 by the motor 32, causes the rocker arm 50 to translate thereby moving the first end 65 such that the nozzle 78 is activated to dispense viscous liquid from the internal liquid reservoir. For example, activation of the nozzle 78 can release a predetermined shot amount (e.g., predetermined dose) of the viscous liquid from the internal liquid reservoir 24.

Figure 15:
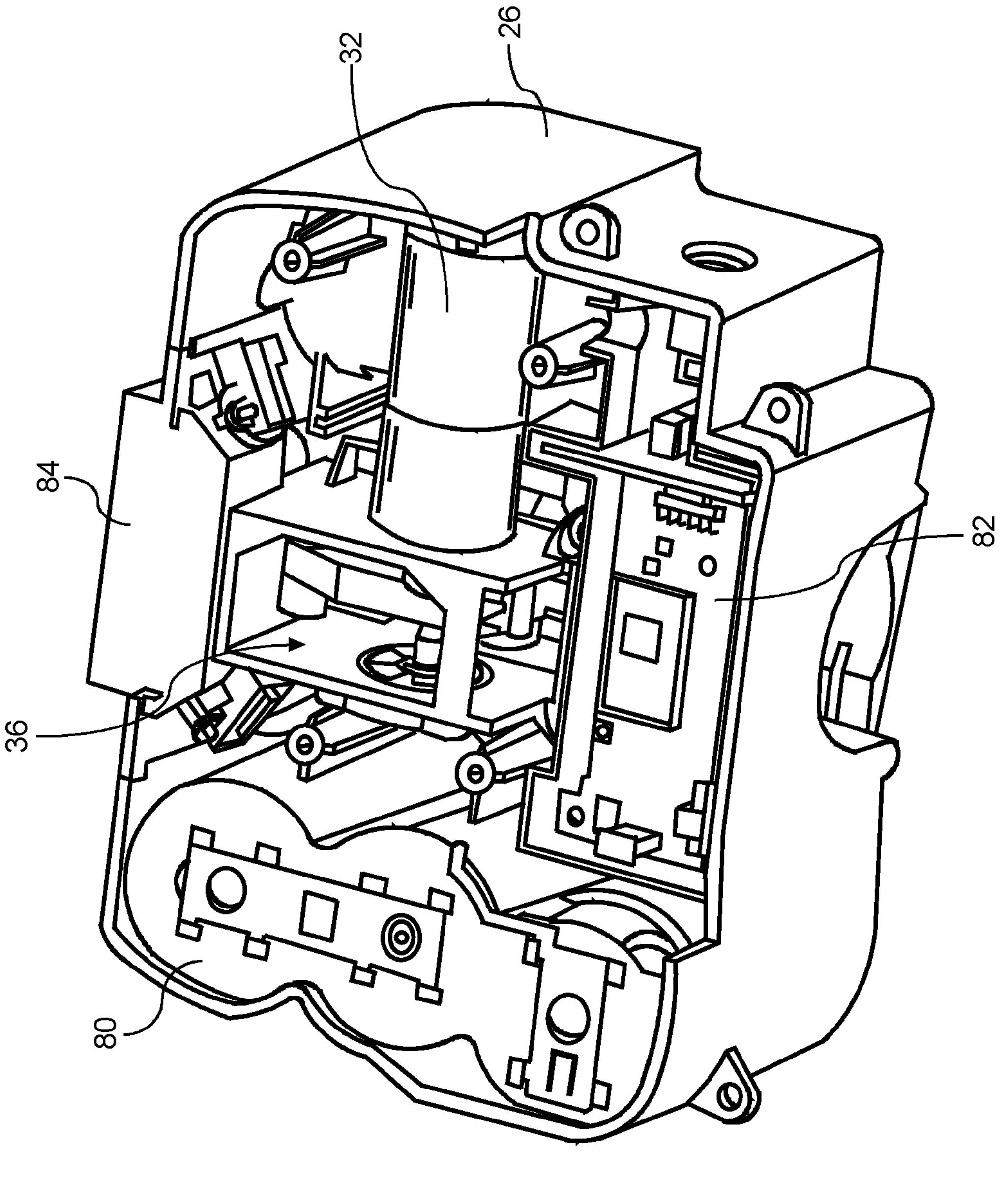
FIG. 15 is a perspective view of a portion of an embodiment of a component module in accordance with the present disclosure.

Additionally, as shown in FIG. 15, other operational components can be disposed within the component module 26 in accordance with the present disclosure. Other operational components can include battery packs 80, printed circuit boards 82, sensors 84 (e.g., activation sensors), sensor modules, switches, controllers or control circuitry (e.g., controllers and/or microprocessors), network enabled devices and/or chips, and combinations thereof. For example, in certain embodiments, one or more battery packs 80 configured to hold one more batteries can be included in the component module 26. For example, the battery pack 80 can be configured to hold a plurality of batteries, such as at least two batteries, such as at least three batteries, such as at least four batteries, etc. The battery pack 80 can further include any shape suitable for holding the desired sized battery. For example, in certain embodiments, the battery pack can be configured to hold D-cell batteries, such as at least three D-cell batteries, such as at least four D-cell batteries. The battery pack 80 can provide structural support in order to hold the batteries in place. Furthermore, the battery pack 80 can be configured to provide electrical connections to each of the batteries, such that the batteries can provide power to other components of the dispenser 10.

In certain embodiments, one or more printed circuit boards 82 can also be disposed in the component module 26. The printed circuit boards 82 can be configured with suitable processors and/or controllers in order to operate the various components of the dispenser 10. In certain embodiments, the printed circuit boards 82 can be disposed in the component module 26 and covered or encased, so as to protect the printed circuit boards 82. For example, in the event that viscous liquid leaks from the internal liquid reservoir 24, the printed circuit boards 82 are housed and fully encased, preventing any leaked liquid from accessing and/or destroying the printed circuit boards 82.

In certain embodiments, the dispenser can also include one or more sensors 84. Again, such sensors 84 can be at least partially housed by the component housing 26. In one embodiment, the sensor 84 an activation sensor that is designed to detect the presence of a user in a detection zone. Such activation sensors can include those configured to emit infrared light. It will be understood, however, that any activation sensor or activation system shown and/or described herein or known in the art, may be mounted in any area of the housing, so long as it operates as disclosed herein. In such embodiments, the sensor 84 includes an activation sensor that is a passive sensor for detecting infrared radiation. Passive infrared detectors for incorporation into viscous liquid dispensers are known in the art. Generally, the sensor 84 is arranged to detect infrared radiation from a user's hands, and upon detecting the radiation, to transmit a signal for activating the motor 32 so as to dispense an amount of viscous liquid through the opening 20.

It will be understood, however, that other activation mechanisms, such as capacitive and ultrasonic, may be used int eh present disclosure. Capacitive proximity sensors produce an electrostatic field that will sense both metal objects and non-metallic materials such as paper, liquids, glass, and cloth. Ultrasonic proximity sensors use a transducer to send and receive high frequency sound signals. When a target enters the beam, the sound is reflected back to the sensors, causing it to energize or de-energize the output circuit. Another sensor type is inductive. In this case, an electromagnetic field is used, however, detection may be limited to only metallic objects. Accordingly, once the presence of a user is detected by the activation sensor, the dispenser 10 can be configured to automatically dispense the viscous liquid product.

In other embodiments, the sensor(s) 84 can include one or more sensors configured to monitor operations of the dispenser 10. For example, the sensors can include a sensor configured to monitor the dispensing mechanism, such as monitor the number of shot counts dispensed, the amount of product dispensed etc. In embodiments, the sensors can include a variety of functional sensors configured to monitor one or more aspects of the dispenser and to generate dispenser data directed thereto. Further, one or more controllers can then be configured to obtain said dispenser data from the one or more sensors, either directly and/or indirectly, and can further be configured to transmit data to a cloud-based management system.

For example, the one or more controllers or other control circuitry can be configured to establish a wireless connection in order to communicate dispenser data to and/or from a cloud-based management system. As an example, the dispenser 10 can be configured to establish a wireless connection with one or more controllers or processing systems capable of wirelessly transmitting data. For instance, wireless connections can be by a Bluetooth Low Energy (BLE) protocol. Wireless connections can also be established by cellular communications.

As previously noted, the dispensing mechanism, including motor assembly 30, may be powered by batteries contained in a battery pack 80 or can be powered by an AC distribution system. If the dispenser 10 includes batteries, a sensor can also be included for determining the power level of the batteries and for providing a signal when the batteries are running low.

As described above, the dispenser 10 can include a controller and control circuitry. The controller and control circuitry can control and monitor all the functions of the dispenser 10 including the amount of viscous product being dispensed, product usage, and any other activities that are occurring within the dispenser. The controller can be configured to communicate information regarding the dispenser 10 to a central control system and/or a cloud-based system via wireless network means and/or through a web-based system.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A dispenser for viscous liquid, comprising:

a housing having an interior volume so as to retain at least one internal liquid reservoir; and a dispensing mechanism contained within the housing for dispensing the viscous liquid, the dispensing mechanism comprising a motor assembly including:

a motor having a motor shaft coupled to a motor holder;

a first elastomeric member disposed between the motor and the motor holder;

a cam having a cam shaft disposed on the motor shaft, the cam shaft having a first end coupled to the cam and a second end coupled to the motor holder; and a rocker arm coupled to the motor holder, the rocker arm having a slot configured to receive the cam shaft and a first end coupled to the internal liquid reservoir such that actuation of the cam shaft moves the rocker arm to dispense the viscous liquid.

2. The dispenser as defined in claim 1, wherein the second end of the cam shaft is disposed in a bearing and is secured to a motor housing via a bearing housing.

3. The dispenser as defined in claim 1, wherein the second end of the cam comprises a member having an L-shaped geometry, wherein a lower end of the L-shaped geometry is on a same centerline as the motor shaft.

4. The dispenser as defined in claim 1, wherein the rocker arm comprises a rocker arm connector configured to close at least a portion of the slot.

5. The dispenser as defined in claim 1, wherein the slot is integrally formed in the rocker arm.

6. The dispenser as defined in claim 1, comprising a component module secured in the interior volume.

7. The dispenser as defined in claim 6, wherein the motor assembly is securely disposed in the component module via one or more connection points.

8. The dispenser as defined in claim 7, wherein one or more elastomeric members are disposed on the one or more connection points between the component housing and the motor assembly.

9. The dispenser as defined in claim 6, wherein one or more battery packs are disposed in the component housing.

10. The dispenser as defined in claim 6, wherein one or more printed circuit boards are disposed in the component housing.

11. The dispenser as defined in claim 10, comprising a switch electrically coupled to the printed circuit board, the switch configured to detect and communicate when a new internal liquid reservoir is placed in the dispenser.

12. The dispenser as defined in claim 6, wherein one or more sensors are disposed in the component housing.

13. The dispenser as defined in claim 12, wherein the one or more sensors comprise an activation sensor.

14. The dispenser as defined in claim 6, wherein at least a portion of the internal liquid reservoir is disposed in the component housing.

15. The dispenser as defined in claim 1, wherein the housing including an opening therethrough adjacent a bottom surface of the housing for dispensing viscous liquid.

16. The dispenser as defined in claim 1, wherein the viscous liquid is hand soap.

17. The dispenser as defined in claim 1, wherein the housing comprises a back cover configured to be secured to a mounting surface and a front cover, the front cover movable from an open position to a closed position.

18. A dispenser for viscous liquid, comprising:

a housing having an interior volume so as to retain at least one internal liquid reservoir; and a dispensing mechanism contained within the housing for dispensing the viscous liquid, the dispensing mechanism comprising a motor assembly including:

a motor having a motor shaft coupled to a motor holder;

a first elastomeric member disposed between the motor and the motor holder;

a cam having a cam shaft disposed on the motor shaft, the cam shaft having a first end coupled to the cam and a second end coupled to the motor holder; and a rocker arm coupled to the motor holder, the rocker arm having a slot configured to receive the cam shaft and a first end coupled to the internal liquid reservoir such that actuation of the cam shaft moves the rocker arm to dispense the viscous liquid;

one or more sensors configured to monitor one or more operations of the dispenser; and one or more controllers configured to obtain dispenser data from the one or more sensors and/or, optionally, configured to transmit data to a cloud-based management system.

19. The dispenser as defined in claim 18, wherein the second end of the cam is disposed in a bearing and is secured to a motor housing via a bearing housing.

20. The dispenser as defined in claim 18, comprising a component module secured in the interior volume, wherein the motor assembly is securely disposed in the component module via one or more connection points, wherein one or more elastomeric members are disposed on the one or more connection points between the component module and the motor assembly.

* * * * *